United States Patent
Carlsson et al.

(10) Patent No.: US 9,516,461 B2
(45) Date of Patent: Dec. 6, 2016

(54) MESH NETWORK APPLIED TO ARENA EVENTS

(71) Applicant: SONY CORPORATION, Tokyo (JP)

(72) Inventors: Gregory Peter Carlsson, Santee, CA (US); Frederick J. Zustak, Poway, CA (US); James R. Milne, Ramona, CA (US)

(73) Assignee: Sony Corporation, Tokyo (JP)

( * ) Notice: Subject to any disclaimer, the term of this patent is extended or adjusted under 35 U.S.C. 154(b) by 7 days.

(21) Appl. No.: 14/332,953

(22) Filed: Jul. 16, 2014

(65) Prior Publication Data
US 2016/0021492 A1 Jan. 21, 2016

(51) Int. Cl.
| | | |
|---|---|---|
| *H04W 24/00* | (2009.01) | |
| *H04W 4/02* | (2009.01) | |
| *H04W 64/00* | (2009.01) | |
| *H04W 76/02* | (2009.01) | |
| *H04W 88/08* | (2009.01) | |
| *H04W 84/18* | (2009.01) | |

(52) U.S. Cl.
CPC ............... *H04W 4/02* (2013.01); *H04W 64/00* (2013.01); *H04W 76/02* (2013.01); *H04W 84/18* (2013.01); *H04W 88/08* (2013.01)

(58) Field of Classification Search
CPC ........ H04W 84/18; H04W 4/02; H04W 4/008; H04W 88/04; H04W 64/00; H04W 4/046; H04W 88/08; H04L 41/12; H04L 12/2602; H04L 27/2601; H04L 45/42
USPC .......................... 455/456.1, 456.3, 11.1, 440, 452.1,455/552.1; 370/328, 315; 340/8.1, 539.13
See application file for complete search history.

(56) References Cited

U.S. PATENT DOCUMENTS

| | | |
|---|---|---|
| 3,985,357 A | 10/1976 | Miller |
| 4,123,511 A | 10/1978 | Heintze |
| 4,301,207 A | 11/1981 | Schomerus |
| 4,340,053 A | 7/1982 | Sarui |
| 4,463,949 A | 8/1984 | McCoy, Sr. et al. |
| 4,625,336 A | 12/1986 | Derderian |
| 4,962,935 A | 10/1990 | Williams |
| 4,992,003 A | 2/1991 | Perach |
| 5,154,266 A | 10/1992 | Bieber et al. |
| 5,201,075 A | 4/1993 | Svetich |
| 5,219,316 A | 6/1993 | Huffman |
| 5,413,328 A | 5/1995 | Glancey et al. |

(Continued)

FOREIGN PATENT DOCUMENTS

| | | |
|---|---|---|
| CN | 101783931 A | 7/2010 |
| JP | 2004233269 | 8/2004 |

(Continued)

OTHER PUBLICATIONS

James R. Milne, Gregory Peter Carlsson, Frederick J. Zustak, "Applying Mesh Network to Luggage", U.S. Appl. No. 14/332,919, Final Office Action dated Jun. 3, 2016.

(Continued)

*Primary Examiner* — Fred Casca
(74) *Attorney, Agent, or Firm* — John L. Rogitz (57) ABSTRACT

Mesh node modules are associated with competitors in an arena to relay through a mesh network formed by the modules competitor biometric and/or parameter information. This information may be selected to be viewed by individual fans accessing their consumer electronics devices during the competition.

7 Claims, 5 Drawing Sheets

(56) References Cited

U.S. PATENT DOCUMENTS

| | | | |
|---|---|---|---|
| 5,639,243 | A | 6/1997 | Ryan et al. |
| 5,755,405 | A | 5/1998 | Socha et al. |
| 5,927,233 | A | 7/1999 | Mainini et al. |
| 5,946,817 | A | 9/1999 | Sato |
| 6,401,250 | B1 | 6/2002 | McNabb |
| 6,438,755 | B1 | 8/2002 | MacDonald et al. |
| 6,588,840 | B1 | 7/2003 | Lombardo |
| 6,742,636 | B2 | 6/2004 | Godshaw |
| 6,810,831 | B1 | 11/2004 | Opfel |
| 6,816,460 | B1* | 11/2004 | Ahmed ............... H04L 45/04 370/238 |
| 6,910,447 | B1 | 6/2005 | Azarian |
| 7,323,981 | B2 | 1/2008 | Peel et al. |
| 7,328,671 | B2 | 2/2008 | Kates |
| 7,416,123 | B2 | 8/2008 | Saperstein et al. |
| 7,438,356 | B2 | 10/2008 | Howman et al. |
| 7,451,927 | B2 | 11/2008 | Saperstein et al. |
| 7,626,966 | B1 | 12/2009 | Ruiter et al. |
| 7,714,708 | B2 | 5/2010 | Brackmann et al. |
| 7,753,826 | B1 | 7/2010 | Oliver et al. |
| 7,768,150 | B2 | 8/2010 | Platania et al. |
| 7,770,539 | B1 | 8/2010 | Zimmerman et al. |
| 7,818,820 | B2 | 10/2010 | Tsujimoto |
| 7,916,025 | B2 | 3/2011 | Locker et al. |
| 7,962,186 | B2 | 6/2011 | Cui et al. |
| 8,149,748 | B2 | 4/2012 | Bata et al. |
| 8,233,846 | B2 | 7/2012 | Rofougaran |
| 8,253,557 | B2 | 8/2012 | Ani et al. |
| 8,366,570 | B1 | 2/2013 | DeMarco et al. |
| 8,526,970 | B2 | 9/2013 | Wala et al. |
| 8,568,191 | B2 | 10/2013 | Rehkemper et al. |
| 8,583,182 | B2 | 11/2013 | Piirainen et al. |
| 8,609,454 | B2 | 12/2013 | Dai et al. |
| 8,624,743 | B2 | 1/2014 | Langer et al. |
| 8,719,001 | B1 | 5/2014 | Izdepski et al. |
| 8,878,671 | B2 | 11/2014 | Buchheim et al. |
| 2004/0125493 | A1 | 7/2004 | Shimotono et al. |
| 2004/0141635 | A1 | 7/2004 | Liang et al. |
| 2004/0167367 | A1 | 8/2004 | Beierle |
| 2005/0034083 | A1 | 2/2005 | Jaeger |
| 2005/0127868 | A1 | 6/2005 | Calhoon et al. |
| 2005/0259033 | A1 | 11/2005 | Levine |
| 2005/0284405 | A1 | 12/2005 | Pomakoy-Poole et al. |
| 2006/0063540 | A1 | 3/2006 | Beuck |
| 2006/0080072 | A1 | 4/2006 | Lachman et al. |
| 2006/0154642 | A1 | 7/2006 | Scannell, Jr. |
| 2006/0224300 | A1 | 10/2006 | Shioya et al. |
| 2006/0242901 | A1 | 11/2006 | Casimaty et al. |
| 2007/0069687 | A1 | 3/2007 | Suzuki |
| 2007/0130893 | A1 | 6/2007 | Davies |
| 2007/0138272 | A1 | 6/2007 | Saperstein et al. |
| 2007/0138273 | A1 | 6/2007 | Saperstein et al. |
| 2007/0152479 | A1 | 7/2007 | Howman et al. |
| 2007/0243296 | A1 | 10/2007 | Bourassa et al. |
| 2008/0036610 | A1 | 2/2008 | Hokuf et al. |
| 2008/0120768 | A1 | 5/2008 | Tsujimoto |
| 2008/0173257 | A1 | 7/2008 | Steiner et al. |
| 2008/0189170 | A1 | 8/2008 | Ramachandra |
| 2008/0229704 | A1 | 9/2008 | Augustyniak et al. |
| 2009/0040048 | A1 | 2/2009 | Locker et al. |
| 2009/0118869 | A1 | 5/2009 | Cauchy et al. |
| 2009/0203367 | A1 | 8/2009 | Pamminger et al. |
| 2010/0020169 | A1 | 1/2010 | Jang et al. |
| 2010/0119755 | A1 | 5/2010 | Chung et al. |
| 2010/0123778 | A1 | 5/2010 | Hada |
| 2010/0152545 | A1 | 6/2010 | Ramsay et al. |
| 2010/0295687 | A1 | 11/2010 | Kuzniar et al. |
| 2011/0005466 | A1 | 1/2011 | Furth |
| 2011/0031928 | A1 | 2/2011 | Soar |
| 2011/0068906 | A1 | 3/2011 | Shafer et al. |
| 2011/0105099 | A1 | 5/2011 | Roll |
| 2011/0270712 | A1 | 11/2011 | Wood et al. |
| 2012/0069051 | A1 | 3/2012 | Hagbi et al. |
| 2012/0099800 | A1 | 4/2012 | Llano et al. |
| 2012/0184200 | A1 | 7/2012 | Chutorash et al. |
| 2012/0303939 | A1 | 11/2012 | Cain et al. |
| 2012/0319487 | A1 | 12/2012 | Shah |
| 2013/0056929 | A1 | 3/2013 | Rehkemper et al. |
| 2013/0063304 | A1* | 3/2013 | O'Regan ............... G01S 5/0027 342/357.55 |
| 2013/0068942 | A1 | 3/2013 | Verenchikov |
| 2013/0093220 | A1 | 4/2013 | Pajic |
| 2013/0132434 | A1 | 5/2013 | Scofield et al. |
| 2013/0134923 | A1 | 5/2013 | Smith et al. |
| 2013/0141251 | A1* | 6/2013 | Sims ............... B60Q 9/008 340/905 |
| 2013/0292976 | A1 | 11/2013 | Kane |
| 2014/0023060 | A1 | 1/2014 | Apte et al. |
| 2014/0025805 | A1 | 1/2014 | Apte et al. |
| 2014/0058866 | A1 | 2/2014 | Okadome |
| 2014/0104046 | A1 | 4/2014 | Howell |
| 2014/0117921 | A1 | 5/2014 | Suomela |
| 2014/0118635 | A1 | 5/2014 | Yang |
| 2014/0148095 | A1 | 5/2014 | Smith et al. |
| 2014/0173439 | A1 | 6/2014 | Gutierrez et al. |
| 2014/0179463 | A1 | 6/2014 | Giles et al. |
| 2015/0348413 | A1 | 12/2015 | Han et al. |
| 2015/0349537 | A1 | 12/2015 | Milne et al. |
| 2015/0349572 | A1 | 12/2015 | McCoy et al. |
| 2016/0019515 | A1 | 1/2016 | Milne et al. |
| 2016/0019788 | A1 | 1/2016 | Milne et al. |
| 2016/0021491 | A1 | 1/2016 | Milne et al. |
| 2016/0021492 | A1 | 1/2016 | Carlsson et al. |
| 2016/0021493 | A1 | 1/2016 | Milne et al. |
| 2016/0021510 | A1 | 1/2016 | Milne et al. |
| 2016/0049993 | A1 | 2/2016 | McCoy et al. |

FOREIGN PATENT DOCUMENTS

| | | | |
|---|---|---|---|
| JP | 2005017465 | | 1/2005 |
| JP | 2006279859 | | 10/2006 |
| JP | 2013168883 | | 8/2013 |
| WO | WO 2009/018835 A1* | 2/2009 | ............. H04L 29/12 |
| WO | 2009130199 A1 | | 10/2009 |
| WO | 2013105920 A2 | | 7/2013 |

OTHER PUBLICATIONS

James R. Milne, Gregory Peter Carlsson, Frederick J. Zustak, "Vehicle Ad Hoc Network (VANET)", related pending U.S. Appl. No. 15/149,562, filed May 9, 2016.

James R. Milne, Gregory Peter Carlsson, Frederick J. Zustak, "Applying Mesh Network to Luggage", related U.S. Appl. No. 14/332,919, Applicant's response to Final Office Action filed Jun. 14, 2016.

Charles McCoy, James R. Milne, True Xiong, "Portable Device to Portable Device Wireless Power Transfer Methods and Systems", related pending U.S. Appl. No. 14/290,409, non-final office action dated Apr. 19, 2016.

James R. Milne, Gregory Peter Carlsson, Frederick J. Zustak, "Mesh Network Applied to Fixed Establishment With Movable Items Therein", related U.S. Appl. No. 14/332,836, Applicant's response to Non-Final Office Action filed Aug. 19, 2016.

Arzoo Dahiya, Dr. R.K. Chauhan, "A Comparative Study of MANET and VANET Environment" Journal of Computing, vol. 2, Issue 7, Jul. 2010, ISSN 2151-9617. http://sites.google.com/site/JournalofComputing/.

Yousaf Saeed, Suleman Aziz Lodhi, Khalil Ahmed, "Obstacle Management in VANET using Game Theory and Fuzzy Logic Control", ACEEE Int. J. on Communications, vol. 4, No. 1, Jul. 2013.

The Seventh ACM International Workshop on Vehicular Inter-NETworking (VANET 2010) in conjunction with ACM MobiCom 2010. Sep. 24, 2010.

Tao Zhang, Xian Chen, Russell Hsing, K. Dnaiel Wong, "VNTA sub-TC" IEEE Communications Society, printed from web Jun. 3, 2014, http://www.danielwireless.com/vnta/.

Reza Azimi, Gaurav Bhatia, Ragunathan (Raj) Rajkumar, Priyantha Mudalige, "Vehicular Networks for Collision Avoidance at Intersections" Society for Automotive Engineers (SAE) World Congress, Apr. 2011, Detroit, MI, USA.

(56) References Cited

OTHER PUBLICATIONS

Timo Kosch, Christian Adler, Stephan Eichler, Christopher Schroth, Markus Strassberger, "The Scalability problem of vehicular ad hoc networks and how to solve it", IEEE Wireless Communications Magazine Oct. 13, 2006, No. 5, S.6. http://www.alexandria.unisg.ch/Publikationen/30977.

Danda B. Rawat, Dimitrie C. Popescu, Gongjun Yan, Stephan Olariu, "Enhancing VANET Performance by joint Adaptation of Transmission Power and Contention Window Size", IEEE Transaction on Parallel and Distributed Systems, vol. 22, No. 9, pp. 1528-1535, Sep. 2011.

Stephan Eichler, Benedikt Ostermaier, Christopher Schroth, Timo Kosch, "Simulation of Car-to-Car Messaging: Analyzing the Impact on the Road Traffic", IEEE Computer Society, 2005; 13th Annual Meeting of the IEEE International Symposium on Modeling, Analysis, and Simulation of Computer and Telecommunications Systems (MASCOTS).

J. Gonzalvez, M. Sepulcre, R. Bauza, "IEEE 802.11p Vehicle to Infrastructure Communications in Urban Environments" IEEE Communications Magazine, vol. 50, No. 5, pp. 176-183, May 2012.

Charles McCoy, James R. Milne, True Xiong, "Portable Device to Portable Drive Wireless Power Transfer Methods and Systems" file history of related pending U.S. Appl. No. 14/290,409, filed May 29, 2014.

James R. Milne, Charles McCoy, True Xiong, "Scalable Antenna System" file history of related pending U.S. Appl. No. 14/290,426, filed May 29, 2014.

Charles McCoy, James R. Milne, True Xiong, "Method and System for Use in Configuring Multiple Near Field Antenna Systems" file history of related pending U.S. Appl. No. 14/460,224, filed Aug. 14, 2014.

James R. Milne, Gregory Peter Carlsson, Frederick J. Zustak, "Applying Mesh Network to Pet Carriers", related U.S. Appl. No. 14/333,006, Non-Final Office Action dated Aug. 27, 2015.

James R. Milne, Gregory Peter Carlsson, Frederick J. Zustak, "Applying Mesh Network to Pet Carriers", related U.S. Appl. No. 14/333,006, Applicant's response to Non-Final Office Action filed Aug. 31, 2015.

James R. Milne, Gregory Peter Carlsson, Frederick J. Zustak, "Applying Mesh Network to Pet Carriers", related U.S. Appl. No. 14/333,006, Final Office Action dated Oct. 28, 2015.

James R. Milne, Gregory Peter Carlsson, Frederick J. Zustak, "Applying Mesh Network to Pet Carriers", related U.S. Appl. No. 14/333,006, Applicant's response to Final Office Action filed Oct. 28, 2015.

James R. Milne, Gregory Peter Carlsson, Frederick J. Zustak, "Applying Mesh Network to Pet Carrier", applicants response to final office action filed Oct. 28, 2015 in related pending U.S. Appl. No. 14/333,006.

James R. Milne, Gregory Peter Carlsson, Frederick J. Zustak, "Applying Mesh Network to Pet Carrier", non-final office action dated Dec. 4, 2015 in related pending U.S. Appl. No. 14/333,006.

James R. Milne, Gregory Peter Carlsson, Frederick J. Zustak, "Applying Mesh Network to Pet Carrier", applicants response to non-final office action filed Dec. 10, 2015 in related pending U.S. Appl. No. 14/333,006.

James R. Milne, Gregory Peter Calrsson, Frederick J. Zustak, "Vehicle Ad Hoc Network (VANET)", related U.S. Appl. No. 14/332,900, Non-Final Office Action dated Jan. 14, 2016.

James R. Milne, Gregory Peter Calrsson, Frederick J. Zustak, "Vehicle Ad Hoc Network (VANET)", related U.S. Appl. No. 14/332,900, Applicant's response to Non-Final Office Action filed Jan. 15, 2015.

James R. Milne, Gregory Peter Carlsson, Frederick J. Zustak, "Applying Mesh Network to Luggage", related pending U.S. Appl. No. 14/332,919, non-final office action dated Jan. 20, 2016.

James R. Milne, Gregory Peter Carlsson, Frederick J. Zustak, "Applying Mesh Network to Luggage", related pending U.S. Appl. No. 14/332,919, filed Jul. 16, 2014.

James R. Milne, Gregory Peter Carlsson, Frederick J. Zustak, "Applying Mesh Network to Pet Carrier", related pending U.S. Appl. No. 14/333,006, filed Jul. 16, 2014.

James R. Milne, Gregory Peter Carlsson, Frederick J. Zustak, "Applying Mesh Network to Stadium Services", related pending U.S. Appl. No. 14/332,849, filed Jul. 16, 2014.

James R. Milne, Gregory Peter Carlsson, Frederick J. Zustak, "Vehicle Ad Hoc Network (VANET)", related pending U.S. Appl. No. 14/332,900, filed Jul. 16, 2014.

James R. Milne, Gregory Peter Carlsson, Frederick J. Zustak, "Mesh Network Applied to Fixed Establishment with Movable Items Therein", related pending U.S. Appl. No. 14/332,836, filed Jul. 16, 2014.

James R. Milne, Gregory Peter Carlsson, Frederick J. Zustak, "Applying Mesh Network to Luggage", related U.S. Appl. No. 14/332,919, Applicant's response to Non-Final Office Action filed Feb. 11, 2016.

James R. Milne, Gregory Peter Carlsson, Frederick J. Zustak "Applying Mesh Network to Pet Carriers", related U.S. Appl. No. 14/333,006, Final Office Action dated Feb. 22, 2016.

James R. Milne, Gregory Peter Carlsson, Frederick J. Zustak, "Applying Mesh Network to Pet Carriers", related U.S. Appl. No. 14/333,006, Applicant's response to Final Office Action filed Mar. 16, 2016.

Shiro Sakata, "Technical Paper, Chapter 2 Ad-Hoc Network, fifth title mobile IP Ad-Hoc Network, fourth group mobile/wirelss, knowledge base, knowledge forest" Institute of Electronics, Information and Communication Engineers, Jun. 10, 2010 URL link http://www.ieice-hbkb.org/files/04/04gun__05hen__02.pdf.

James R. Milne, Gregory Peter Carlsson, Frederick J. Zustak, "Mesh Network Applied to Fixed Establishment with Movable Items Therein", related pending U.S. Appl. No. 14/332,836 non-final office action dated Jul. 25, 2016.

* cited by examiner

(Ball game)

FIG. 6

(horse race)

FIG. 7 car race

FIG. 8

MESH NETWORK APPLIED TO ARENA EVENTS

FIELD OF THE INVENTION

The application relates generally to mesh networks applied to arena events.

BACKGROUND OF THE INVENTION

A mesh network is a type of computer ecosystem characterized by its sustainability, self-organization, and scalability. Each mesh node relays network data flowing to the node, and the nodes cooperate to appropriately distribute the data in the network. Typically, mesh networks are relatively short range networks, i.e., with node-to-node link distances of 250 meters or less, although a mesh network may use a gateway to connect to a wide area network such as the Internet.

Because mesh networks typically are wireless, they are ad hoc, meaning that nodes easily join and leave the network. As but one example, mesh networks can be spontaneously organized by the wireless computing devices establishing the nodes using Zigbee. Other example non-limiting mesh network protocols/systems can be based on Wi-Fi IEEE 802.11p IEEE 802.11s, WAVE IEEE 1609,WiMAX IEEE 802.16, Bluetooth, and IRA.

When the wireless nodes of a mesh network move as the network operates, the network is sometimes referred to as a mobile ad hoc network (MANET) which continuously self-configures as nodes move into network range and out of network range. For this reason, nodal links in MANETs change frequently. MANETs may operate independently but may also use one or more of the nodes as a gateway to other MANETs and other networks such as the Internet.

Of relevance to this application is the application of mesh/MANET principles to arena events.

SUMMARY OF THE INVENTION

As understood herein, for arena events including stadium events, broadcasters provide player-specific information which is limited to what the broadcasters determine to be relevant. The consumer has no say in what information they receive. Present principles mesh network the players in the arena so that not only can real time data on the player become available, it can be selectively accessed by fans. This also enables predictive forecasting of outcomes and opponent failures. In other words, by mesh networking players/participants, such as ball players (football, basketball, baseball, etc.), horses, race cars, motorcycles, etc., real time data becomes available to the spectators, enriching their experience. Data can also be compiled by teams for real-time analysis, half-time analysis, and/or summary analysis.

Accordingly, a system includes a mesh network dynamically established among first computerized node modules operatively engaged with respective competitors in an arena. At least some of the first computerized node modules communicate respective location information among each other. A monitoring computer receives location information from the first computerized node modules via at least one access point (AP) communicating with at least one of the first computerized node modules.

In some implementations the arena is a human sports stadium. Or, the arena can be a horse race track or an automobile race track.

In non-limiting examples the first computerized node modules (FCNM) communicate with each other using mesh network principles, such that messages may be relayed from FCNM to FCNM until one or more FCNM are close enough to an access point to communicate, via the access point, with a receiving network. The receiving network can be or can include the Internet, or the receiving network can be a stadium intranet.

In another aspect, a method includes receiving information related to real time conditions of at least some competitors in an arena from a mesh network established by respective node modules engaged with the respective competitors in the arena. The method includes presenting the information on at least one display device.

The information may include, e.g., biometric information of the respective competitor, vehicle information of the respective competitor, location information of the respective competitor.

In another aspect, a non-transitory computer readable storage medium (NTCRSM) bears instructions executable by a processor to configure the processor to present on a display a first user interface (UI) including a selector element selectable to view information on at least one competitor in an arena. The instructions when executed by the processor configure the processor to, responsive to selection of the selector element, present on the display information on at least one competitor in an arena. The information is received from a mesh network established by respective node modules associated with respective competitors in the arena.

The NTCRSM may be implemented in a consumer electronics (CE) device configured to download an application onto the NTCRSM enabling presentation of the first UI. The first UI may include a biometric selector selectable to view biometric information on a competitor, and may also include a statistics selector selectable to view statistics of a competitor. In some examples, the instructions when executed by the processor configure the processor to present on the display one or more biometric parameters of a competitor as uploaded through the mesh network. If desired, the instructions when executed by the processor may configure the processor to present on the display a message indicating what at least one competitor is doing kinematically. In some implementations, the instructions when executed by the processor configure the processor to present on the display a replay selector selectable to cause a replay of arena action to be presented on the display.

As detailed further below, in example embodiments the instructions when executed by the processor configure the processor to present on the display a graphic or video image of a race track establishing the arena. The instructions when executed by the processor can also configure the processor to present on the display operating parameters of at least one competitor vehicle in the arena.

The details of the present invention, both as to its structure and operation, can be best understood in reference to the accompanying drawings, in which like reference numerals refer to like parts, and in which:

DETAILED DESCRIPTION

This disclosure relates generally to computer ecosystems and in particular to mesh networks and MANETs. A system herein may include server and client components that establish mesh network nodes, connected over a network such that data may be exchanged between the client and server components, although mesh networks may not include servers. The nodes may include one or more computing devices including portable televisions (e.g. smart TVs, Internet-enabled TVs), portable computers such as laptops and tablet computers, and other mobile devices including smart phones, mesh node modules that can be attached to moving objects, and additional examples discussed below. These devices may operate with a variety of operating environments. For example, some of the devices may employ, as examples, operating systems from Microsoft, or a Unix operating system, or operating systems produced by Apple Computer or Google.

Nodes, however implemented, may include one or more processors executing instructions that configure the node to receive and transmit data over a mesh network such as a MANET. A device such as a server may be instantiated by a game console such as a Sony Playstation (trademarked), a personal computer, etc.

Information may be exchanged over a network between network nodes. To this end and for security, nodes can include firewalls, load balancers, temporary storages, and proxies, and other network infrastructure for reliability and security. One or more nodes may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio. Note that a non-transitory computer readable storage medium explicitly includes hardware such as flash memory which may lose data upon loss of power.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Figure 1:
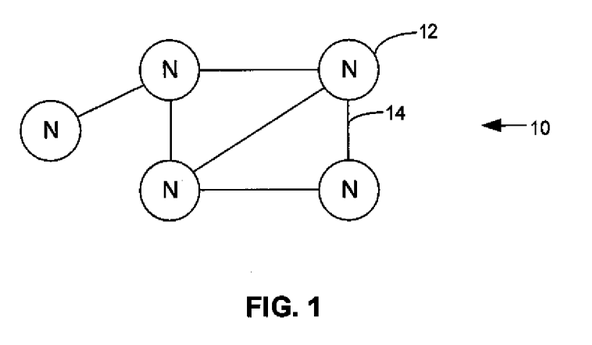
FIG. 1 is a block diagram of an example system including an example in accordance with present principles.

Now specifically referring to FIG. 1, an example mesh network 10 is shown, which may include one or more of the example devices mentioned above and described further below in accordance with present principles. These devices establish respective nodes 12 of the mesh network 10. The nodes 12 can spontaneously join and leave the network 10 as mentioned above, and when a node is a member of the network 10, it communicates with at least some of the other nodes 12 via wireless links 14. The nodes 12 may all be connected to every other node, or more typically are connected only to one or more of the other nodes, forwarding data through the network using "hop" principles and other relevant mesh protocol principles.

The nodes 12 may all be mobile nodes and may communicate only within the network 10, and not outside the network 10. More typically, at least one of the nodes 12 is a router or other gateway device that interfaces the mesh network 10 with other networks, such as the Internet. In some embodiments, one or more of the nodes 12 may be a fixed node, e.g., a gateway router or a server whose location does not change after installation or changes only infrequently, with the remaining node(s) 12 being mobile, while in some embodiments all of the nodes 12 may be fixed nodes.

In any case, the node 12 dynamically establish a mesh network, typically through one or more of the short-range transmitters described below. Each node typically is associated with a unique identification such as a media access control (MAC) address, and the MAC address may be correlated within the node (e.g., at time of manufacture or by a user at time of association with a particular component) or within a network server receiving information from the node with an identification of the component with which the MAC address is associated. For example, a nodal module may be associated with a vehicle, a person, an animal, a bicycle, a piece of luggage or a pet kennel, a particular stadium seat, a player in an arena, an item in a factory or store, a user's CE device, etc., and the MAC address of that node may be correlated with the component accordingly. Consequently, when a mesh network is established and at least one of the network nodes uploads information gathered from the other nodes, that information may include (or be correlated at a server to) a type of component, so that a network map or other network information user interface (UI) may be presented showing the mesh nodes along with an identification of the components, and not just the MAC addresses, with which the nodes are associated.

Figure 2:
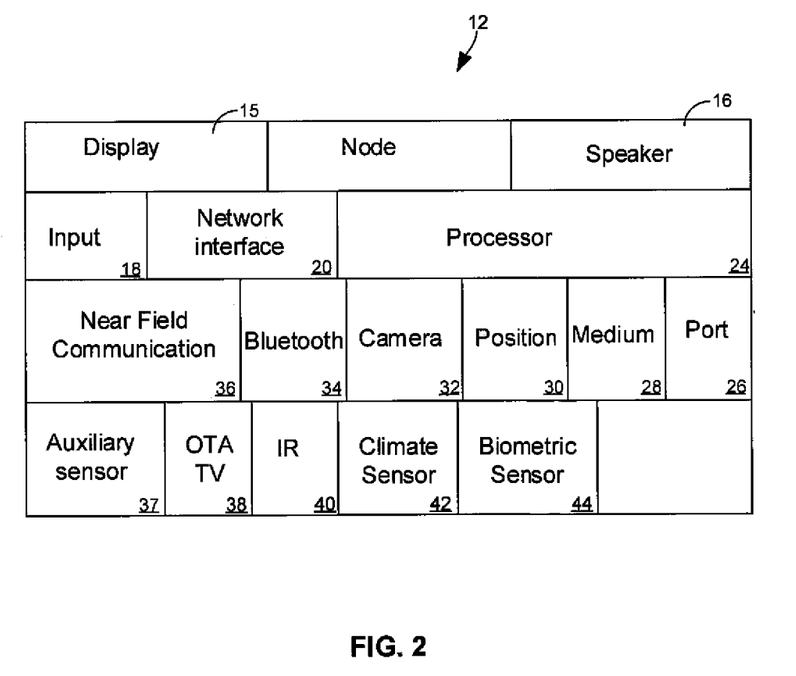
FIG. 2 is a schematic diagram of an example node.

FIG. 2 shows that an example node 12 can (but not must) include one or more displays 15 that may be implemented by a high definition or ultra-high definition "4K" or higher flat screen and that may be touch-enabled for receiving user input signals via touches on the display. The node 12 may include one or more speakers 16 for outputting audio in accordance with present principles, and at least one additional input device 18 such as e.g. an audio receiver/microphone for e.g. entering audible commands to the node 12 to control the node 12. The example node 12 may also include one or more network interfaces 20 for communication over at least one network under control of one or more processors 24. Thus, the interface 20 may be, without limitation, a Wi-Fi transceiver, which is an example of a wireless computer network interface. It is to be understood that the processor 24 controls the node 12 to undertake present principles, including the other elements of the node 12 described herein such as e.g. controlling the display 15 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the node 12 may also include one or more input ports 26 such as, e.g., a high definition multimedia interface (HMI) port or a USB port to physically connect (e.g. using a wired connection) to another CE device and/or a headphone port to connect headphones to the node 12 for presentation of audio from the node 12 to a user through the headphones. For example, the input port 26 may be connected via wire or wirelessly to a cable or satellite source of audio video content. Thus, the source may be, e.g., a set top box, or a satellite receiver, or a game console or disk player.

The node 12 may further include one or more tangible computer readable storage medium 28 such as disk-based or solid state storage. The data storage may contain the identification and price, for example, of an item on which it is to be applied or engaged. Also in some embodiments, the node 12 can include one or more position or location receivers such as but not limited to a cellphone receiver, GPS receiver and/or altimeter 30 that is configured to e.g. receive geographic position information from at least one satellite or cellphone tower and provide the information to the processor 24 and/or determine an altitude at which the node 12 is disposed in conjunction with the processor 24. However, it is to be understood that that another suitable position receiver other than a cellphone receiver, GPS receiver and/or altimeter may be used in accordance with present principles to e.g. determine the location of the node 12 in e.g. all three dimensions.

Continuing the description of the node 12, in some embodiments the NODE 12 may include one or more cameras 32 that may be, e.g., a thermal imaging camera, a digital camera such as a webcam, and/or a camera integrated into the node 12 and controllable by the processor 24 to gather pictures/images and/or video in accordance with present principles. Also included on the node 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the node 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), other type of proximity sensor such as a camera executing image recognition to determine a particular object is close, etc.) providing input to the processor 24. The node 12 may include an over-the-air TV broadcast port 38 for receiving OTA TV broadcasts providing input to the processor 24. In addition to the foregoing, it is noted that the node 12 may also include an infrared (IR) transmitter and/or IR receiver and/or IR transceiver 40 such as an IR data association (IRDA) device. A battery (not shown) may be provided for powering the node 12.

The node 12 may include still other sensors such as e.g. one or more climate sensors 42 (e.g. barometers, humidity sensors, wind sensors, light sensors, temperature sensors, etc.) and/or one or more biometric sensors 44 providing input to the processor 24. For instance, the biometric sensor(s) may include heart rate sensors, temperature sensors, blood pressure sensors, blood sugar sensors, perspiration sensors, etc.

The components of a node 12 may communicate with each other via wires and/or wirelessly and thus may be distributed on a contestant, e.g., may be distributed over an automobile or athlete's body.

The above methods may be implemented as software instructions executed by a processor, suitably configured ASIC or FPGA modules, or any other convenient manner as would be appreciated by those skilled in those art. Where employed, the software instructions may be embodied in a non-transitory device such as a CD Rom or Flash drive. The software code instructions may alternatively be embodied via a download over the internet.

Figure 3:
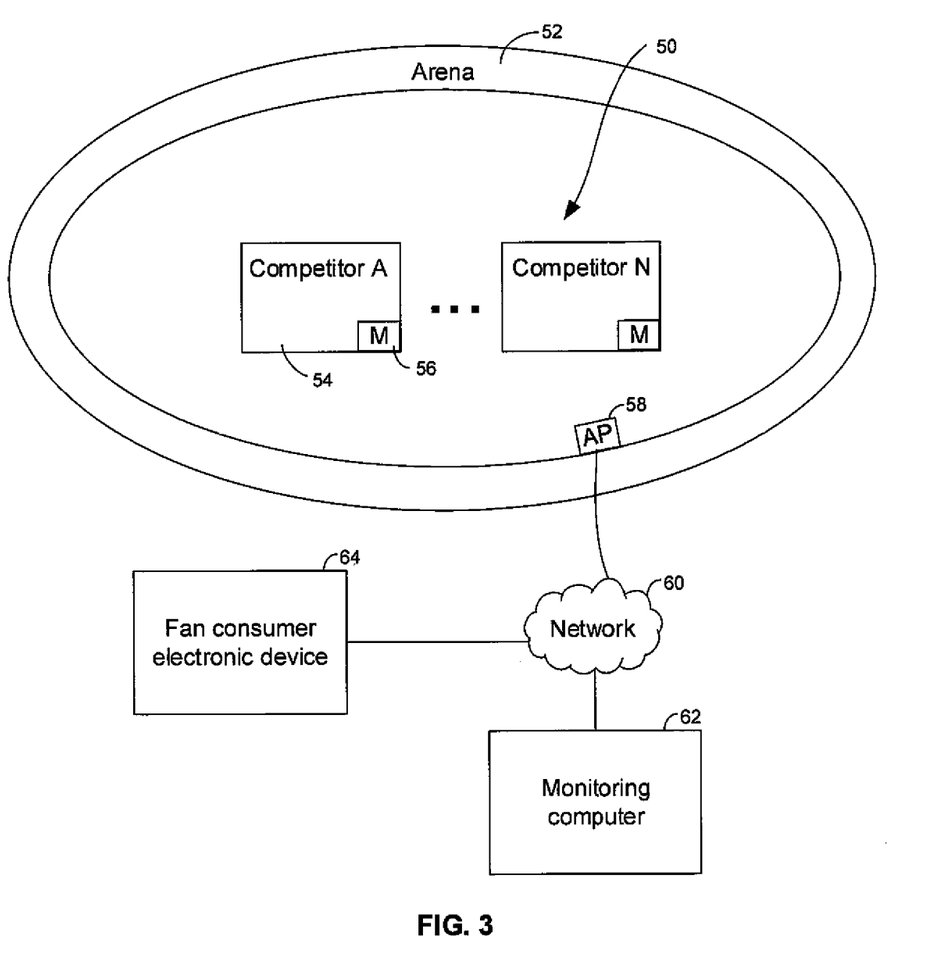
FIG. 3 is a schematic diagram of an example mesh network.

FIG. 3 shows an example mesh network 50 in an arena 52. Without limitation, the arena may be a football or baseball or soccer or other sports stadium, an indoor arena, a horse or automobile racetrack.

In any case, multiple competitors 54 typically compete in the arena 52. At least some and preferably all competitors are embellished with respective node modules 56, which may be implemented by some or all of the components of the module 12 shown in FIG. 2. A competitor may wear a node module in a helmet, a shoe, on clothing, on a tag, under a saddle cloth for a horse, in a race car for auto racing, etc.

The node modules 56 may include one or more of the node 12 components shown in FIG. 2, and communicate using mesh network principles, such that messages may be relayed from node to node until one or more nodes is close enough to an access point 58 to communicate, via the access point 58, with a receiving network 60 such as the Internet or a stadium intranet having one or more central monitoring/control/management computers 62 which may include appropriate components of a node 12 in FIG. 2. The computers 62 may be, for example, server or desktop or other similar computers in the use by employees of the stadium or a broadcaster therein. Portable communication computer electronic devices 64 such as smart phones that are held by fans in the arena may also communicate with the network 60. The CE devices may include appropriate components of a node 12 in FIG. 2.

Figure 4:
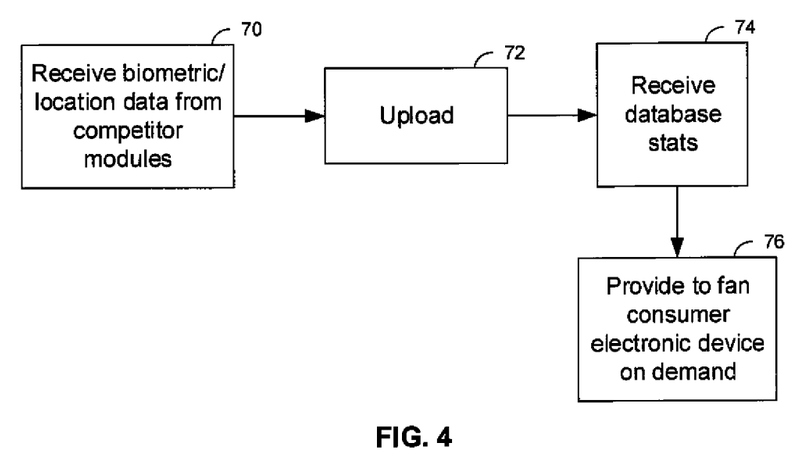
FIG. 4 is a flow chart of example non-limiting logic.

FIG. 4 shows example overall logic of some embodiments. At block 70 biometric information and location information may be received from the node modules 56 by, e.g., other node modules in the mesh network 50. The information may also include, for automobile racing applications, automobile condition/operating parameters as received by an automobile-mounted node module from, e.g., an engine control module (ECM) of the vehicle. The node module may be combined with the ECM if desired. Biometric information from athletes may include heart rate, perspiration, temperature, breathing rate, etc. Automobile condition/operating parameters may include, e.g., engine RPM, speed, braking information, turning information, engine temperature, etc.

The information from a reporting node module 56 from its own sensors and from other node modules as obtained by the reporting node module 56 from messages received from other node modules in the mesh may be uploaded at block 72 to the computers 62, 64 via the AP 58 and network 60. Various statistics pertaining to competitors 54 may be received by one or more of the computers 62, 64 from a database at block 74. At block 76 the statistics and node module information are provided as appropriate to, e.g., one or more fan CE devices 64.

Figure 5:
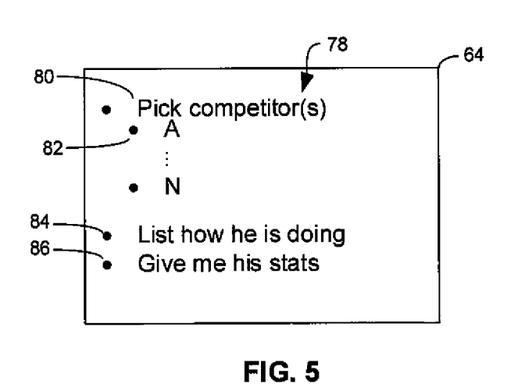
FIGS. 5-8 are screen shots of example user interfaces.

FIG. 5 shows an example user interface (UI) 78 that can be presented on the display of a fan CE device 64. The fan CE device 64 may, upon entry into the arena, communicate with the monitoring computer 62 or other computer to download an application to obtain statistics and real time competitor information from the node modules. The application may be executed to facilitate communication between the fan CE device 64 and monitoring computer 62 for presentation of the UIs discussed herein. Thus, a fan may connect his CE device (or allow it to automatically connect) to a wireless local area network in the arena to establish communication with the monitoring computer 62, and may be prompted to download the application to obtain ancillary real time data and statistics on competitors.

In the example shown, the UI 78 may include a prompt 80 to select a competitor to view information on. A list 82 of competitors may be provided from which a user can select a competitors. The user can filter the information using a selector 84 to view biometric and kinetic information on the competitor, and a selector 86 to view statistics of the competitor.

Figure 6:
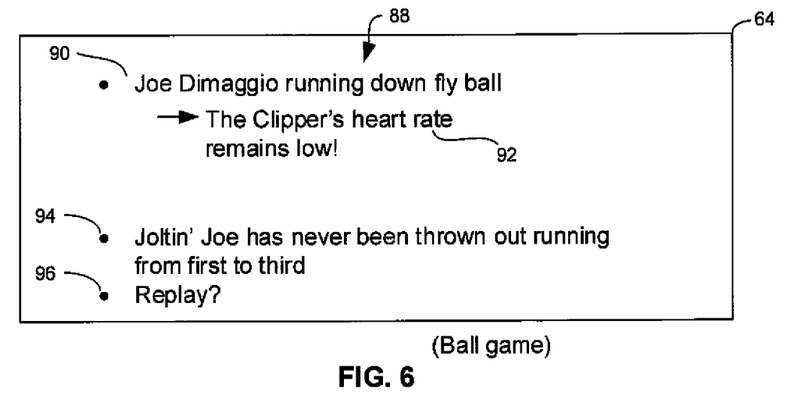

The selections of FIG. 5 may produce the example UI 88 of FIG. 6, in which a competitor's name 90 is presented. Responsive to selection of the selector 84 in FIG. 5, a message 92 may be presented that is related to one or more biometric parameters of the competitor as uploaded through the mesh network to the network from the node module engaged with the competitor. The message may also indicate what the competitors is doing kinematically based on image recognition from a video feed of the event.

Also, statistics 94 may be presented responsive to selection of the statistics selector 86 in FIG. 5. Note that the statistics may include a list of numeric statistics from which a user may select or it may include qualitative comments as shown that the arena operator or broadcaster wishes to send to fans. Should an event have occurred in the arena, the fan can select a replay selector 96 which when selected causes a replay of, e.g., the most recent 30 seconds of arena action to be presented on the CE device 64 as downloaded, for instance, from the monitoring computer 62.

Figure 7:
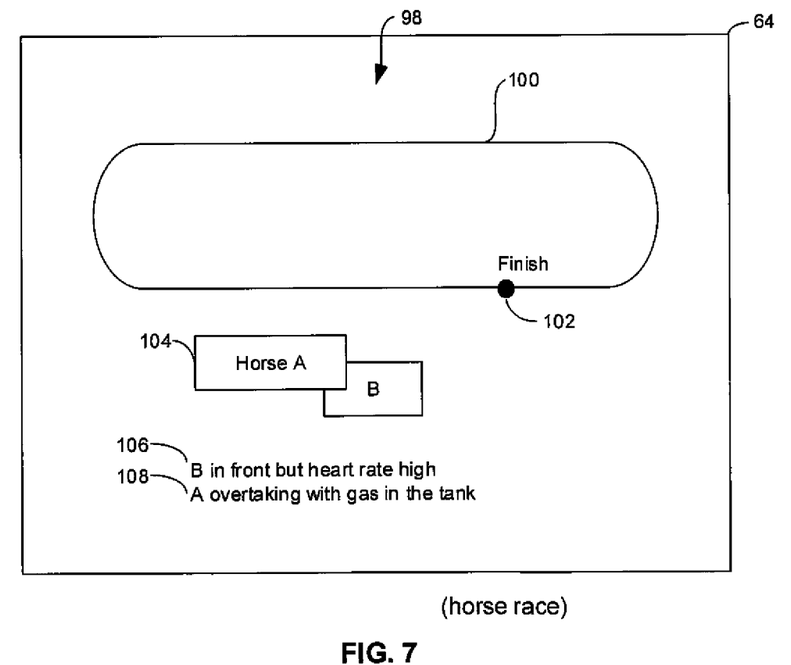

FIG. 7 illustrates an example UI 98 in the context of a horse race. A graphic or video image 100 of the racetrack establishing the arena may be shown along with an indication 102 of the finish line. Icons or actual video images 104 of the horses may also be presented, located at their current positions around the track.

As shown at 106, a biometric indication of one or more horses may be presented as uploaded from the node module of the horse through the mesh network and ultimately to a monitoring computer, or to the fan's CE device directly. Based on image recognition in video, the message may indicate where in the pack the horse is located. As well, a second message 108 on another horse may be presented with a qualitative indication of the horse's relative progress (gaining or losing ground, for instance) as derived from image recognition in video and with a qualitative indication of the horse's physical condition. In the example shown, horse "A" is indicated as having "gas in the tank" based on a heart rate of horse "A" below a predetermined threshold. This threshold may vary with distance, increasing with increasing distance.

Figure 8:
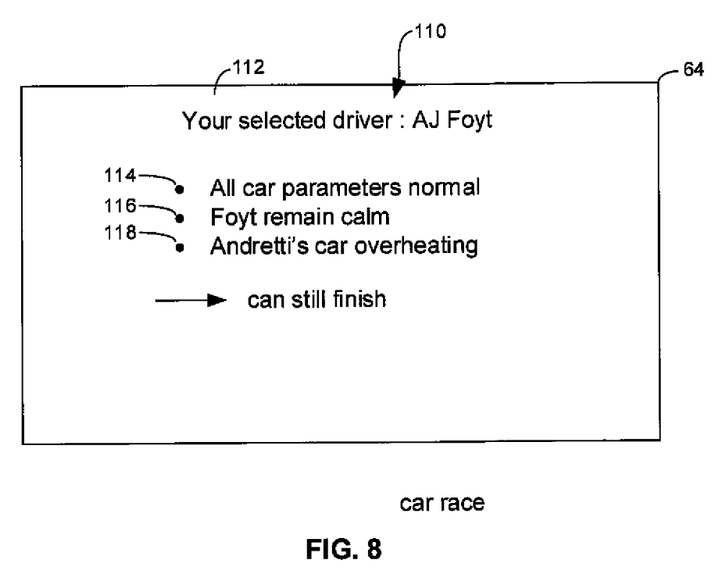

FIG. 8 illustrates an example UI 110 in the context of an automobile race. A message 112 indicates that the user has selected a particular driver. Based on signals from the driver's node module receiving signals from, e.g., the vehicle's ECM, a message 114 indicates that the car's parameters are normal. To do this, the raw data from the ECM may indicate an out of specification condition and may be accessed directly, or the application may compare parameter values from the node module to ranges of acceptable parameters and indicate a parameter is out of range or within all ranges, as appropriate.

Also, the car's node module may receive biometric signals from the driver. These signals may be compared to ranges of normal signals and a message 116 presented accordingly, informing the fan using the CE device 64 whether the driver is biologically normal using, if desired, qualitative or numeric indications as desired. Likewise, messages 118 may be presented based on vehicle parameter signals of other vehicles, informing the user of possible problems and malfunctions in those vehicles as well as fuel status, in the instance shown, qualitatively so. Qualitative indications of this type may be generated by comparing the reported fuel level in the car to a table correlating distances remaining in the race to minimum fuel loads needed to reach those distances.

Thus, it may now be appreciated that present principles enable data-driven prediction and statistics in real time, adding to the consumer experience. In some embodiments, such as a race car, failure could be predicted. For example, tire pressure dropping or engine temperature rising beyond a threshold rate. This type of data logging and monitoring as uploaded through a mesh network allows comparison and prediction of the larger picture, not just each participant individually. Combining the data from each car, their relative positions, and remaining duration of the race enables outcome prediction as well as failure prediction.

It will be appreciated that while the MESH NETWORK APPLIED TO ARENA EVENTS has been fully described in relation to one or more example embodiments, these are not intended to be limiting, and that various alternative arrangements may be used to implement the subject matter claimed herein.

What is claimed is:
1. System comprising:
a mesh network dynamically established among first computerized node modules operatively engaged with apparel of respective competitors in an arena, at least some of the first computerized node modules configured with code for communicating at least respective location information and biometric information from the respective competitor among each other; and
at least one monitoring computer configured with code for receiving location information and biometric information from at least the first computerized node modules via at least one access point (AP) configured with code for communicating with at least one of the first computerized node modules and providing the location information and biometric information to plural spectator consumer electronic devices in the arena, wherein the arena is one of: a human sports stadium, a horse race track, an automobile race track.

2. The system of claim 1, wherein the arena is a human sports stadium.

3. The system of claim 1, wherein the arena is a horse race track.

4. The system of claim 1, wherein the arena is an automobile race track.

5. The system of claim 1, wherein the first computerized node modules (FCNM) are configured with code to communicate with each other using mesh network principles, such that messages may be relayed from FCNM to FCNM until one or more FCNM are close enough to an access point to communicate, via the access point, with a receiving network.

6. The system of claim 5, wherein the receiving network is the Internet.

7. The system of claim 5, wherein the receiving network is a stadium intranet.

* * * * *